United States Patent
Athley et al.

(10) Patent No.: US 8,737,275 B2
(45) Date of Patent: May 27, 2014

(54) NODE IN A WIRELESS COMMUNICATION SYSTEM WITH DIFFERENT ANTENNA DIVERSITY METHODS FOR UPLINK AND DOWNLINK

(75) Inventors: Fredrik Athley, Kullavik (SE); Martin Johansson, Molndal (SE); Sara Landstrom, Lulea (SE); Arne Simonsson, Gammelstad (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 87 days.

(21) Appl. No.: 13/322,969

(22) PCT Filed: Jun. 1, 2009

(86) PCT No.: PCT/EP2009/056697
§ 371 (c)(1),
(2), (4) Date: Nov. 29, 2011

(87) PCT Pub. No.: WO2010/139353
PCT Pub. Date: Dec. 9, 2010

(65) Prior Publication Data
US 2012/0069780 A1    Mar. 22, 2012

(51) Int. Cl.
*H04J 3/00*    (2006.01)

(52) U.S. Cl.
USPC .......................................... 370/280; 370/334

(58) Field of Classification Search
None
See application file for complete search history.

(56) References Cited

U.S. PATENT DOCUMENTS

| | | | |
|---|---|---|---|
| 6,115,585 A | 9/2000 | Matero et al. | |
| 2002/0132600 A1* | 9/2002 | Rudrapatna | 455/277.1 |
| 2003/0139198 A1* | 7/2003 | Johannisson et al. | 455/525 |
| 2005/0037718 A1* | 2/2005 | Kim et al. | 455/101 |
| 2005/0143037 A1 | 6/2005 | Stratis et al. | |
| 2006/0146755 A1* | 7/2006 | Pan et al. | 370/334 |
| 2007/0099578 A1 | 5/2007 | Adeney et al. | |

(Continued)

FOREIGN PATENT DOCUMENTS

| | | |
|---|---|---|
| CN | 1898976 A | 1/2007 |
| CN | 101018370 A | 8/2007 |

(Continued)

OTHER PUBLICATIONS

Tsoulos, Smart antennas for mobile communication systems: benefits and challenges, Apr. 1999, Electronics and communication engineering journal.*

(Continued)

*Primary Examiner* — Otis L Thompson, Jr.
*Assistant Examiner* — Rina Pancholi
(74) *Attorney, Agent, or Firm* — Rothwell, Figg, Ernst & Manbeck, P.C.

(57) ABSTRACT

The present invention relates to a node in a wireless communication system, the node comprising at least a first, a second and a third antenna function. A first and second downlink signal, and a first and second uplink signal are transferred via said antenna functions, which together form a first total antenna function and a second total antenna function. The first and second downlink signals are transferred via the first total antenna function, and the first and second uplink signal are transferred via the second total antenna function. The second downlink signal and the second uplink signal are transferred via a common connection connected to a filter means which is arranged for separating these signals to connect them to different antenna functions. The present invention also relates to a corresponding method.

16 Claims, 5 Drawing Sheets

(56) References Cited

U.S. PATENT DOCUMENTS

| | | | |
|---|---|---|---|
| 2007/0205955 A1* | 9/2007 | Korisch et al. | 343/853 |
| 2008/0096492 A1 | 4/2008 | Yoon | |
| 2009/0021434 A1* | 1/2009 | Lee et al. | 343/703 |

FOREIGN PATENT DOCUMENTS

| | | |
|---|---|---|
| CN | 101272169 A | 9/2008 |
| EP | 1 309 103 A1 | 5/2003 |
| EP | 1 551 080 A1 | 7/2005 |
| EP | 1887713 A2 | 2/2008 |
| EP | 1973238 A1 | 9/2008 |
| GB | 2 355 155 A | 4/2001 |
| WO | 2004015887 A1 | 2/2004 |

OTHER PUBLICATIONS

Office Action dated Nov. 4, 2013, issued in Chinese Patent Application No. 200980159694.0, 23 pages.

* cited by examiner

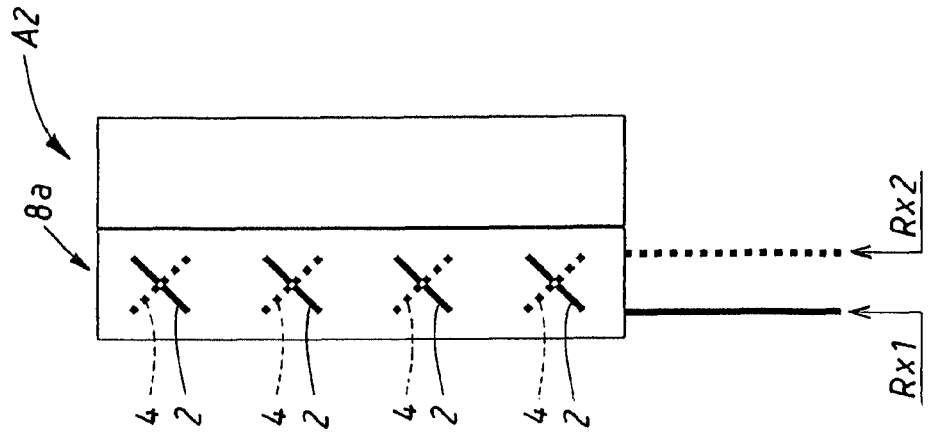
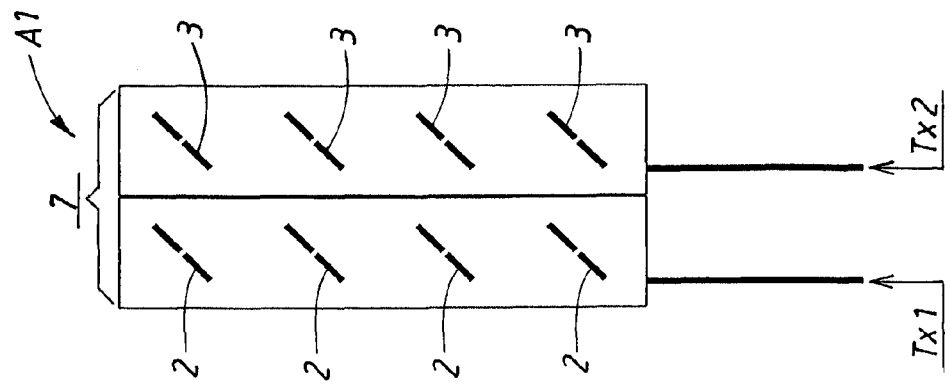
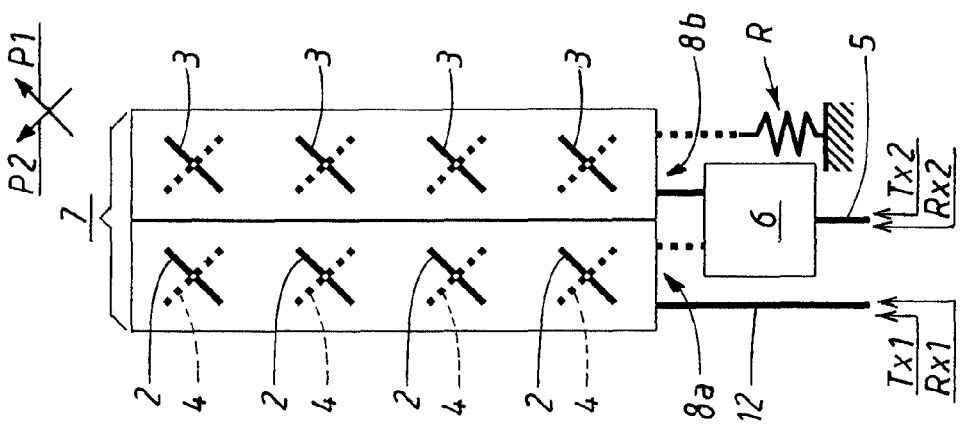
FIG. 3b
FIG. 3a
FIG. 2

NODE IN A WIRELESS COMMUNICATION SYSTEM WITH DIFFERENT ANTENNA DIVERSITY METHODS FOR UPLINK AND DOWNLINK

CROSS-REFERENCE TO RELATED APPLICATION

This application is a 35 U.S.C. §371 National Phase Entry Application from PCT/EP2009/056697, filed Jun. 1, 2009, and designating the United States.

TECHNICAL FIELD

The present invention relates to a node in a wireless communication system, the node comprising at least a first antenna function, a second antenna function and a third antenna function. A first downlink signal, a second downlink signal, a first uplink signal and a second uplink signal are transferred via said antenna functions. The antenna functions together form a first total antenna function and a second total antenna function.

The present invention also relates to a method for obtaining desired antenna functionality for a first downlink signal, a second downlink signal, a first uplink signal and a second uplink signal in a node in a wireless communication system. The method comprises the steps: transferring the first downlink signal, and the first uplink signal via a first antenna function; transferring the second downlink signal via a second antenna function; and transferring the second uplink signal via a third antenna function; where the antenna functions together form a first total antenna function and a second total antenna function.

BACKGROUND

Many mobile communications systems, for example implemented using the radio access standard known as LTE (Long Term Evolution), make use of the concept referred to as MIMO (multiple input, multiple output), i.e., multiple parallel wireless communication signal streams originating from one (distributed) location and intended for another (distributed) location with all signal streams using the same time and frequency resource.

For example, for a desired performance, transmitting antennas for the individual signals are suitably arranged to inject signal power into the propagation environment in such a way as to create an effective propagation channel with high rank when the signals are detected by similarly suitably arranged antennas at the receiving end of a multi-stream wireless communication link.

In the following, the two ends of a communication link will be denoted "access point" and "terminal", these two representing for example a macro base station and laptop computer, respectively, exchanging information in a mobile communications system.

A propagation channel has a certain rank, where the rank corresponds to a measure of the number of independent routes a signal may propagate for a given number of antenna ports; in other words the rank is the number of degrees of freedom which is granted by a certain arrangement of antenna functions and the environment where the signal propagates i.e., the wave propagation channel. How antenna functions are arranged in the propagation environment affects the rank.

A high rank propagation channel, i.e., a channel with a rank close to the number of available independent signals, can be achieved by arranging antennas in such a way that variations in amplitude and phase of the individual transferred signals become decorrelated. Spatially separated antennas as well as orthogonally polarized antennas are two common means for achieving decorrelation. Which one of these two arrangements that is the preferred one depends on the specific propagation environment and the properties of the access point and the terminal.

In some MIMO implementations, for example LTE systems, a concept called pre-coding is available. Pre-coding involves a coherent transmission of the same signal from more than one antenna. This results in beam-forming or polarization forming, depending on the properties of the antennas used for transmitting the signal and also depending on the propagation environment. For co-polarized antennas covering essentially the same angular space in an idealized free-space environment, the transmitted signals will add coherently, resulting in beams or, more generally, an interferometer-like electromagnetic field behavior, with in- and out-of-phase signal addition for different directions in space, which depends on the antenna separation distance. Similarly, for antennas with different, for example orthogonal, polarizations, different polarization states will result for different directions in space.

Real propagation environments will cause a less distinct division between beam-forming and polarization forming. However, for many antenna installations, for example when the transmitting antennas are placed and oriented in an access point to radiate on downlink into an effective free-space environment, i.e., an environment without any significant obstacles present between the antenna and the so-called Fraunhofer region, farfield patterns can and will develop before the effects of scattering and multi-path propagation set in. This is of course works reciprocally on uplink.

In previously known solutions, the same antennas or antenna functions are used for transmission and reception. For a TDD (Time Division Duplex) system, the transmitted and received signals are separated in time, and for an FDD (Frequency Division Duplex) system, the transmitted and received signals are separated in frequency. Alternatively, independent radio chains are used for transmission or reception for those antennas that are used only for uplink or downlink. Some implementations of switched antenna systems used for wireless LAN provide an example of the latter whereas conventional base stations in all present standards are an example of the former.

The first existing solution, a system using the same antenna function for downlink and uplink, as manifested by the radiation pattern properties, cannot provide simultaneous optimized performance of both links, if the downlink and uplink system performance have different optima with respect to the radiation pattern. An example is that in certain scenarios beam-forming with closely spaced co-polarized antennas can be optimal for downlink while receiver diversity with dual-polarized antennas can be optimal for uplink.

The second existing solution, a system using independent radio chains or, at the very least, separate feeder lines, will require more feeder cables than the number of parallel signal streams. For example, a 2×2 MIMO system with two co-polarized antennas used for beam-forming on downlink, and two orthogonally polarized antennas used for diversity reception on uplink, will require three feeder cables.

There is thus a need for a node in a wireless communication system where the antenna functions can be made to differ for downlink and uplink in an efficient manner.

SUMMARY

The object of the present invention is to provide a node in a wireless communication system where the antenna functions can be made to differ for downlink and uplink in an efficient manner.

This object is achieved by means of a node in a wireless communication system, the node comprising at least a first antenna function, a second antenna function and a third antenna function. A first downlink signal, a second downlink signal, a first uplink signal and a second uplink signal are transferred via said antenna functions. The antenna functions together form a first total antenna function and a second total antenna function. The first downlink signal and the second downlink signal are transferred via the first total antenna function, and the first uplink signal and the second uplink signal are transferred via the second total antenna function. The second downlink signal and the second uplink signal are transferred via a common connection connected to a filter means which is arranged for separating the second downlink signal and the second uplink signal for connecting them to different antenna functions.

This object is also achieved by means of a method for obtaining desired antenna functionality for a first downlink signal, a second downlink signal, a first uplink signal and a second uplink signal in a node in a wireless communication system. The method comprises the steps: transferring the first downlink signal, and the first uplink signal via a first antenna function; transferring the second downlink signal via a second antenna function; and transferring the second uplink signal via a third antenna function; where the antenna functions together form a first total antenna function and a second total antenna function. Furthermore, the method comprises the following steps: transferring the first downlink signal and the second downlink signal via the first total antenna function; transferring the first uplink signal and the second uplink signal via the second total antenna function; and transferring the second downlink signal and the second uplink signal via a common connection connected to a filter means which is used for separating the second downlink signal and the second uplink signal for connecting them to different antenna functions.

According to an example, the first total antenna function comprises the first antenna function and the second antenna function, said first and second antenna functions constituting a two-dimensional array antenna where all antenna elements have the same polarization. Furthermore, the second total antenna function comprises the first antenna function and the third antenna function, said first and third antenna functions constituting a dual polarized array antenna.

When antenna elements are indicated to have the same polarization it is in this context not meant as those polarizations being mathematically exactly the same, but the same to an extent of what is practically possible to achieve.

According to another example, the first total antenna function comprises the first antenna function and the second antenna function, said first and second antenna functions constituting a two-dimensional array antenna where all antenna elements have the same polarization. Furthermore, the second total antenna function comprises the first antenna function and the third antenna function, said first and third antenna functions constituting two linear array antennas where all antenna elements essentially have the same polarization and the linear array antennas are spaced apart with a distance that exceeds two wavelengths in air for the centre frequency of the frequency band used According to another example, the downlink signals and the uplink signals, respectively, are either separated in time by means of time division duplex, TDD, or in frequency by means of frequency division duplex, FDD, and where the filter means either is in the form of at least one switch or a duplex filter, respectively.

Other examples are disclosed in the dependent claims.

The invention provides a number of advantages, for example:
- Separate radiation pattern generation on uplink and downlink;
- Beam-forming on downlink and polarization or space diversity on uplink; and
- Only as many feeder cables as there are independent signals required, i.e., two for a 2×2 MIMO system.

BRIEF DESCRIPTION OF THE DRAWINGS

The present invention will now be described more in detail with reference to the appended drawings, where:

FIG. 2 shows a front view of an antenna configuration according to a first example of the present invention;

FIG. 3a shows the antenna elements used for a first total antenna function in the antenna configuration according to FIG. 2;

FIG. 3b shows the antenna elements used for a second total antenna function in the antenna configuration according to FIG. 2;

DETAILED DESCRIPTION

Figure 1:
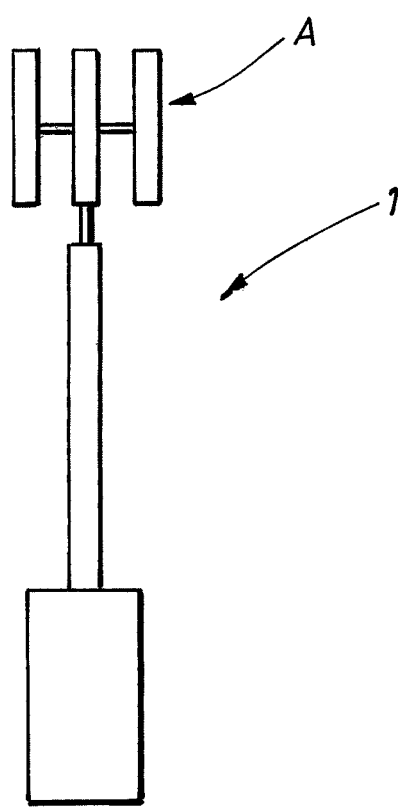
FIG. 1 shows a node in a wireless communication system.

With reference to FIG. 1, there is a node 1 in a wireless communication system, the node 1 comprising a number of antennas A. More in detail, with reference to FIG. 2, according to a first example, the antennas comprise a first antenna function 2, a second antenna function 3 and a third antenna function 4. In FIG. 2, the antenna functions are schematically shown as respective arrays of antenna elements, the antenna elements being drawn with solid or dotted lines depending on polarization.

A first downlink signal Tx1, a second downlink signal Tx2, a first uplink signal Rx1 and a second uplink signal Rx2 are transferred to these antenna functions 2, 3, 4 which together form a first total antenna function and a second total antenna function.

Generally, the term uplink refers to the transfer of a signal from a user terminal to a base station, and the term downlink refers to the transfer of a signal from a base station to a user terminal. The user terminal may be in the form of a mobile phone or a portable computer, constituting a node in a wireless communication system. The base station also constitutes a node in a wireless communication system.

The first antenna function 2 is constituted by a first linear array antenna having a first polarization p1, the second antenna function 3 is constituted by a second linear array antenna having the first polarization p1, and the third antenna function is a third linear array antenna having a second polarization p2. The term linear array antenna refers to an antenna where the radiating elements are positioned in a line, the radiating elements being either linearly polarized or dually polarized. A linear array antenna may also be regarded as a one-dimensional array antenna.

In FIG. 3a and FIG. 3b, the antenna functions are schematically shown as respective arrays of antenna elements, the antenna elements being drawn with solid or dotted lines depending on polarization.

With reference also to FIG. 3a, showing the antenna elements used for the first total antenna function A1, the first total antenna function A1 comprises the first antenna function 2 and the second antenna function 3, said first and second antenna functions 2, 3 thus constituting a two-dimensional array antenna 7 where all antenna elements have the same polarization p1. With reference also to FIG. 3b, showing the antenna elements used for the second total antenna function A2, the second total antenna function A2 comprises the first antenna function 2 and the third antenna function 4, said first and third antenna functions 2, 4 constituting a dual polarized array antenna 8a. The term two-dimensional array antenna refers to an antenna where the radiating elements are positioned in at least two adjacent lines, the radiating elements being either linearly polarized or dually polarized. The radiating elements are thus distributed in two dimensions.

Preferably, but not exclusively, and as shown in FIG. 2 and FIG. 3b, the first linear array antenna and the third linear array antenna together form a dual polarized linear array antenna 8a, although they could be formed by separate linear array antennas.

As shown in FIG. 2, the second antenna function 3, a linear array antenna with the first polarization p1, is a part of another dual polarized linear array antenna 8b, where the second unused polarization is terminated in a termination resistance R. This configuration is shown as an example, and may be used if it is found practical, for example if it is desired only to use one antenna type. It is of course possible that the second antenna function 3 is realized in a single polarized linear array antenna only.

According to the present invention, the first downlink signal Tx1 and the second downlink signal Tx2 are connected to the first total antenna function, and the first uplink signal Rx1 and the second uplink signal Rx2 are connected to the second total antenna function. The second downlink signal Tx2 and the second uplink signal Rx2 are fed in a common connection 5 connected to a filter means 6 which is arranged for separating the second downlink signal Tx2 and the second uplink signal Rx2 for connecting them to different antenna functions.

As mentioned previously, for a TDD (Time Division Duplex) system, the transmitted and received signals are separated in time, and for an FDD (Frequency Division Duplex) system, the transmitted and received signals are separated in frequency.

In a TDD version of this example, the downlink signals Tx1, Tx2 and the uplink signals Rx1, Rx2, respectively, are separated in time by means of TDD. In this case the filter means 6 is in the form of at least one switch which is arranged to switch between the second downlink signal Tx2 and the second uplink signal Rx2.

In an FDD version of this example, the downlink signals Tx1, Tx2 and the uplink signals Rx1, Rx2, respectively, are separated in frequency by means of FDD. In this case the filter means 6 is in the form of a duplex filter which is arranged to separate between the second downlink signal Tx2 and the second uplink signal Rx2.

This means that for downlink, the total antenna function A1 comprises a two-dimensional array antenna 7 where all antenna elements have the same polarization p1, i.e. two closely spaced co-polarized antennas. Such a total antenna function provides the possibility of beamforming and thus a desired coverage.

Furthermore, for uplink, the total antenna function A2 comprises a dual polarized array antenna 8a. Such a total antenna function can be optimal for uplink, since polarization diversity may be desired in that case.

Thus, by introducing a quad antenna arrangement containing a filter means 6', the invention allows a 2×2 MIMO system to be operated in such a way as to optimize both downlink and uplink performance, without the need for additional feeder cables. By using two "co-polarized ports" for downlink transmission, pre-coding will in effect generate beam-forming, since the patterns corresponding to the used ports have the same polarization and thus add coherently.

With the two antennas of the first antenna function 2 and the second antenna function 3 located not more than a few wavelengths apart, ideally less than a wavelength, a well-defined beam will be generated for each choice of pre-coding vector by the combination of the patterns from the two antennas, thus providing a spatial (angular) filter on downlink. This relates to a wavelength in air for the centre frequency of the frequency band used. On uplink, "cross-polarized ports", i.e., ports corresponding to radiation patterns with orthogonal polarizations, are used. This arrangement requires two feeder cables. Note that the uplink ports could be associated with the different antennas (not as shown). With pre-coding vectors uniformly spanning the available code space, no compensation for, or information about, any phase differences introduced by the duplex functionality is needed.

Figure 4:
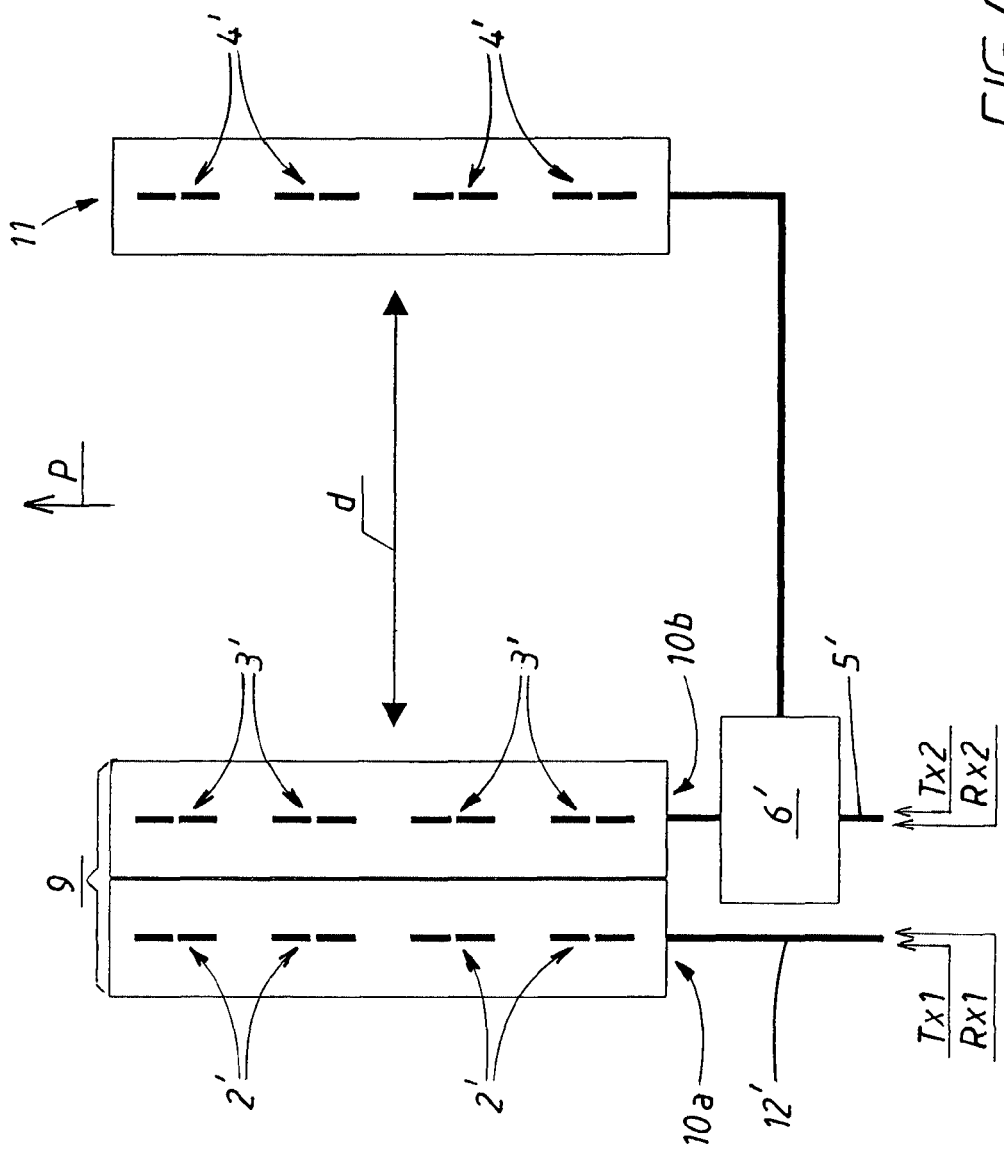
FIG. 4 shows a front view of an antenna configuration according to a second example of the present invention.
Figure 5:
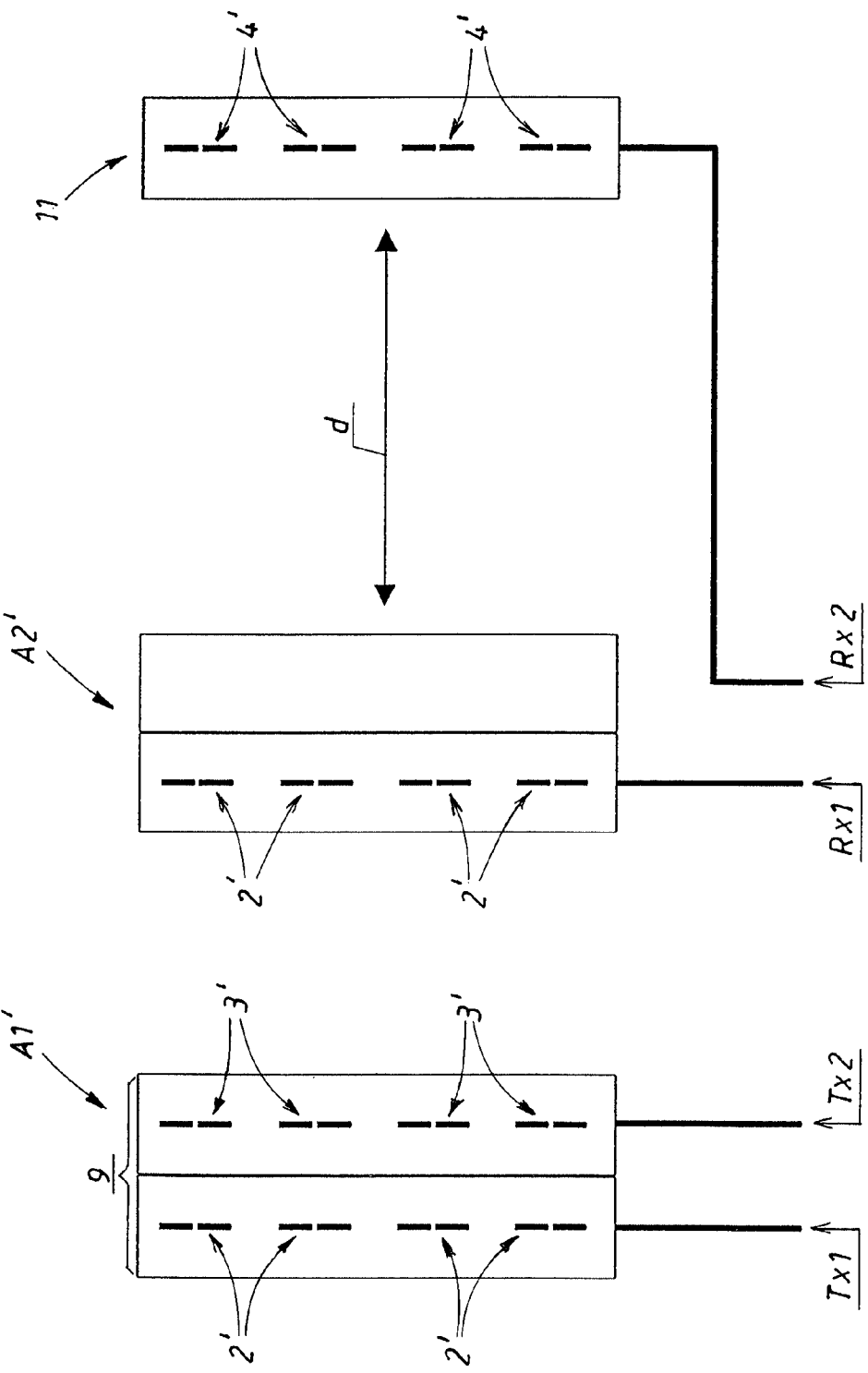
FIG. 5a shows the antenna elements used for a first total antenna function in the antenna configuration according to FIG. 4.
FIG. 5b shows the antenna elements used for a second total antenna function in the antenna configuration according to FIG. 4.

In FIG. 4, FIG. 5a and FIG. 5b, the antenna functions are schematically shown as respective arrays of antenna elements.

With reference to FIG. 4, according to a second example, the first, second and third antenna functions 2', 3', 4' are constituted by a first linear array antenna 10a, a second linear array antenna 10b and a third linear array antenna 11, respectively, where all antenna elements essentially have the same polarization p.

The first linear array antenna 10a and the second linear array antenna 10b, corresponding to said first and second antenna functions 2', 3' together constitute a two-dimensional array antenna 9 where all antenna elements have the same polarization p.

The first linear array antenna 10a and the third linear array antenna 11, corresponding to said first and third antenna functions 2', 4' are spaced apart with such a distance d such that space diversity is achieved. The distance d is preferably approximately 10λ or more, but always exceeding 2λ, where λ denotes the wavelength in air for the centre frequency of the frequency band used.

With reference also to FIG. 5a, the first total antenna function A1' comprises the first antenna function 2' and the second antenna function 3'. With reference also to FIG. 5b, the second total antenna function A2' comprises the first antenna function 2' and the third antenna function 4'.

This means that for downlink, the total antenna function A1' comprises a two-dimensional array antenna 9 where all antenna elements have the same polarization p, i.e. two closely spaced co-polarized antennas as in the first example. Such a total antenna function provides the possibility of beamforming and thus a desired coverage.

Furthermore, for uplink, the total antenna function A2' comprises two spatially separated antennas where all antenna elements have the same polarization p. Such a total antenna function can be optimal for uplink, since space diversity may be desired in that case. In other words, for downlink a desired beam forming is achieved, while for uplink receiver diversity and spatial multiplexing is supported.

By introducing such a three-antenna arrangement containing a filter means 6', the invention allows a 2×2 MIMO system to be operated in such a way as to optimize both downlink and uplink performance, without the need for additional feeder cables.

Thus, in the examples described above, the present invention provides different total antenna functions for uplink and downlink signals.

The present invention employs filter means in the form of a single duplex filter function to separate downlink and uplink signals, the thus separated downlink and uplink signals being associated with different antenna functions which are independently tailored to the propagation environment such that the system performance is optimized, allowing the number of feeder cables to be two. The first downlink signal Tx1 and the first uplink signal Rx1 are fed in a common connection 12, 12' connected to the first antenna function.

Figure 6:
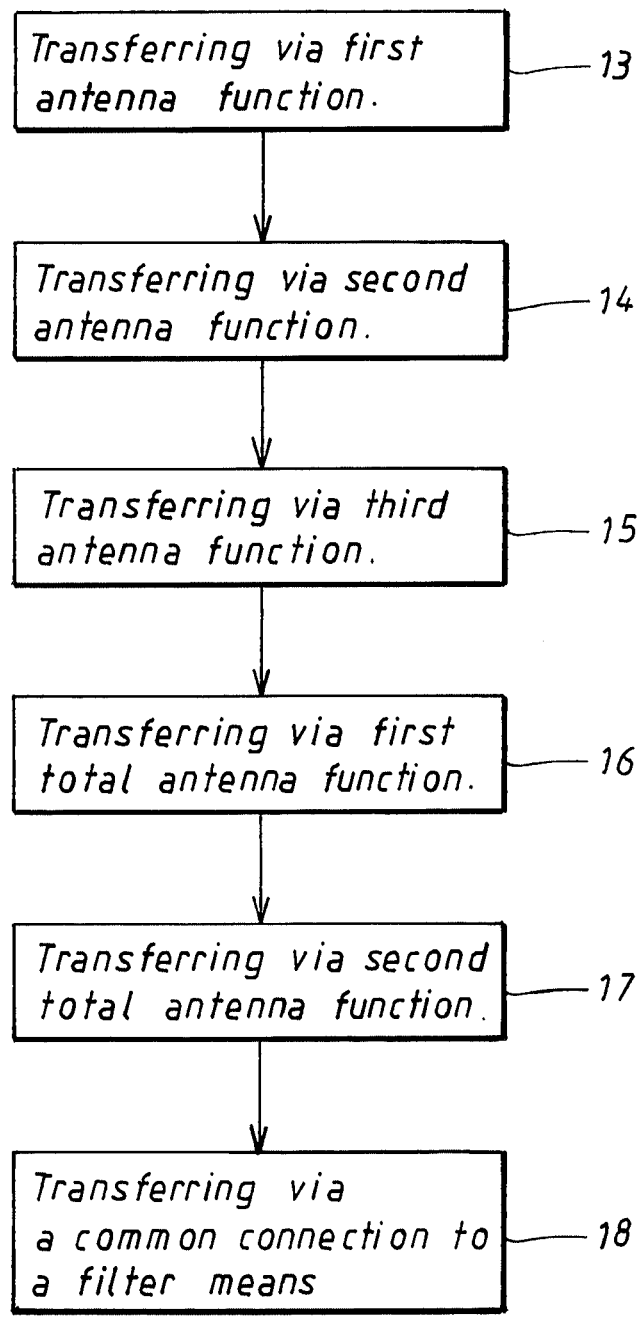
FIG. 6 shows a flowchart of a method according to the present invention.

With reference also to FIG. 6, the present invention also relates to a method for obtaining desired antenna functionality for a first downlink signal Tx1, a second downlink signal Tx2, a first uplink signal Rx1 and a second uplink signal Rx2 in a node in a wireless communication system. The method comprises the steps:

13: Transferring the first downlink signal Tx1, and the first uplink signal Rx1 via a first antenna function 2.

14: Transferring the second downlink signal Tx2 via a second antenna function 3.

15: Transferring the second uplink signal Rx2 via a third antenna function 4, where the antenna functions 2, 3, 4 together form a first total antenna function A1, A1' and a second total antenna function A2, A2'.

16: Transferring the first downlink signal Tx1 and the second downlink signal Tx2 via the first total antenna function A1, A1'.

17: Transferring the first uplink signal Rx1 and the second uplink signal Rx2 via the second total antenna function A2, A2'.

18: Transferring the second downlink signal Tx2 and the second uplink signal Rx2 via a common connection 5 connected to a filter means 6 which is used for separating the second downlink signal Tx2 and the second uplink signal Rx2 for connecting them to different antenna functions.

The present invention is not limited to the examples presented above, but may vary freely within the scope of the appended claims. For example, although the examples illustrated comprise a respective antenna configuration suitable for a system with two TX and two RX branches, the present invention is generally applicable to antenna arrangements with an arbitrary number of antenna ports. An antenna function may comprise any suitable number of antennas and respective radiating elements.

A total antenna function may comprise any suitable number of antenna functions. Typically the number of antenna functions is chosen to be at most one less than the sum of the maximum number of independent signals that a node can support on uplink and downlink. For a node supporting 2×2 MIMO on uplink and downlink, a typical choice would be to have three antenna functions.

The two-dimensional array antenna may comprise more than two closely spaced linear array antennas. The distance between these antennas is ideally less than a wavelength, but of course this distance may vary. As previously, this relates to a wavelength in air for the centre frequency of the frequency band used.

Furthermore, the first polarization p1, and the second polarization p2 may have any relation, but preferably they are non-equal, and most preferably they are essentially orthogonal. The polarizations used may have any desired inclination with respect to the linear extension of the antenna elements used, where the most used ones are 0°, 90° and +45°, −45°.

Other types of connections are possible, depending on what type of performance that is desired for uplink and downlink. This may depend on what kind of node that the present invention is used at: it is not necessary that it is used at a base station as illustrated in FIG. 1, but it may be used at any suitable node in a wireless communication system such as for example a fixed wireless terminal, a repeater or a relay. This may also depend on the propagation channel. It is to be noted that all antenna connections and arrangements work reciprocally, i.e. both for transmitting and receiving.

For example, the first total antenna function and the second total antenna function may be interchanged. In the example with reference to FIG. 2 this means that the first total antenna function comprises the first antenna function 2 and the third antenna function 4, said first and third antenna functions 2, 4 constituting a dual polarized array antenna 8a. Correspondingly, the second total antenna function then comprises the first antenna function 2 and the second antenna function 3, said first and second antenna functions 2, 3 thus constituting a two-dimensional array antenna 7 where all antenna elements have the same polarization p1.

This means that for uplink, the total antenna function comprises a two-dimensional array antenna 7 where all antenna elements have the same polarization p1, i.e. two closely spaced co-polarized antennas. Such a total antenna function provides the possibility of beamforming and thus a desired coverage.

Furthermore, for downlink, the total antenna function comprises a dual polarized array antenna 8a.

This interchange is of course possible for all conceivable antenna configurations within the frame of the present invention.

For a first user, a certain set of signals is used, and a certain first total antenna function and a certain second total antenna function is used. For a second user, a different set of signals is used, and another first total antenna function and another second total antenna function is used. This may be due to that the first user moves slowly relative to the second user, the first user may for example be fixed and the second user may be travelling in a car.

The downlink signals Tx1, Tx2 may be mutually more or less correlated, depending on the fraction of signal content which has been subjected to pre-coding and the fraction of signal content which has not been subjected to pre-coding. More uplink and downlinks signals than those discussed above may be used, for example if the system is larger, i.e., comprising more antenna functions than those shown.

If more antenna functions are used than those shown in the examples described, more filter means may have to be used. It is also possible that filter means of the types switch and duplex filter both are used at a certain node.

The antenna elements may be of any suitable type, such as for example slots, patches, dipoles or combinations of these.

Many other antenna and feeding arrangements are conceivable, but the basic idea of the present invention is to provide a node in a wireless communication system comprising an antenna arrangement that offers different radiation pattern characteristics on transmit and receive, such that the downlink and uplink performance (in the case of an access point) is separately optimized, without the need for additional feeder cables between the antenna and the radio unit. This is achieved by introducing a mechanism for separating the downlink and uplink signals at the antenna, such that different antenna functions are used depending on the link direction. Two primary implementations are identified: duplex filters for FDD systems and switches for TDD systems.

The invention claimed is:

1. A node in a wireless communication system, comprising:
   at least a first antenna, a second antenna, and a third antenna,
   wherein said first antenna and said second antenna form a first total antenna function and wherein said first antenna and said third antenna form a second total antenna function,
   wherein the node is configured to transfer a first downlink signal of a first user and a second downlink signal of the first user via the first total antenna function,
   wherein the node is configured to transfer a first uplink signal of the first user and a second uplink signal of the first user via the second total antenna function,
   wherein the second downlink signal of the first user and the second uplink signal of the first user are transferred via a common connection connected to a filter which is arranged for separating the second downlink signal of the first user and the second uplink signal of the first user by connecting them to a different one of the first antenna, second antenna, and third antenna,
   wherein the node is configured to transfer a set of signals of a second user via another set of total antenna functions, wherein the another set of total antenna functions for the second user comprises a first total antenna function different from the first total antenna function for the first user and a second total antenna function different from the second total antenna function for the first user, and
   wherein the first user is traveling at a different speed than the second user.

2. The node according to claim 1, wherein said first antenna and said second antenna form a two-dimensional array antenna, wherein all antenna elements of the first antenna and of the second antenna have the same polarization, and
   wherein said first antenna and said third antenna form a dual polarized array antenna.

3. The node according to claim 2, wherein the first antenna comprises a first linear array antenna having a first polarization, the second antenna comprises a second linear array antenna having the first polarization, and the third antenna comprises a third linear array antenna having a second polarization.

4. The node according to claim 3, wherein the first linear array antenna and the third linear array antenna together form a dual polarized linear array antenna.

5. The node according to claim 1, wherein said first antenna and said second antenna constitute a two-dimensional array antenna where all antenna elements have the same polarization, and wherein said first antenna and said third antenna constitute two linear array antennas where all antenna elements have the same polarization and wherein the two linear array antennas are spaced apart with a distance that exceeds two wavelengths of a center frequency of a frequency band used by the wireless communication system.

6. The node according to claim 1, wherein the first downlink signal of the first user and the first uplink signal of the first user are transferred via a common connection, which is connected to the first antenna.

7. The node according to claim 1, wherein the downlink signals and the uplink signals of the first user are separated in time by a time division duplex (TDD), and wherein the filter includes at least one switch.

8. The node according to claim 1, wherein the downlink signals and the uplink signals of the first user are separated in frequency by a frequency division duplex (LFDD), and wherein the filter includes a duplex filter.

9. A method for obtaining desired antenna functionality in a wireless communication system, the method comprising:
   transferring a first downlink signal of a first user and a first uplink signal of the first user via a first antenna;
   transferring a second downlink signal of the first user via a second antenna;
   transferring a second uplink signal of the first user via a third antenna;
   wherein the first antenna and the second antenna form a first total antenna function and wherein the first antenna and the third antenna form a second total antenna function,
   wherein:
   the first downlink signal of the first user and the second downlink signal of the first user are transferred via the first total antenna function;
   the first uplink signal of the first user and the second uplink signal of the first user are transferred via the second total antenna function; and
   the second downlink signal of the first user and the second uplink signal of the first user are transferred via a common connection connected to a filter which is arranged for separating the second downlink signal of the first user and the second uplink signal of the first user by connecting them to a different one of the first antenna, second antenna and third antenna, and
   wherein the method further comprises transferring a set of signals of a second user via another set of total antenna functions, wherein the another set of total antenna functions for the second user comprises a first total antenna function different from the first total antenna function for the first user and a second total antenna function different from the second total antenna function for the first user, and
   wherein the first user is traveling at a different speed than the second user.

10. The method according to claim 9, wherein said first antenna and said second antenna constitute a two-dimensional array antenna, wherein all antenna elements of the first antenna and of the second antenna have the same polarization, and
    wherein said first antenna and said third antenna constitute a dual polarized array antenna.

11. The method according to claim 10, wherein the first antenna comprises a first linear array antenna having a first polarization, the second antenna comprises a second linear array antenna having the first polarization, and the third antenna comprises a third linear array antenna having a second polarization.

12. The method according to claim 11, wherein the first linear array antenna and the third linear array antenna together form a dual polarized linear array antenna.

13. The method according to claim 9, wherein said first antenna and said second antenna constitute a two-dimensional array antenna where all antenna elements have the same polarization, and wherein said first antenna and said third antenna constitute two linear array antennas where all antenna elements have the same polarization and wherein the two linear array antennas are spaced apart with a distance that exceeds two wavelengths of a centre frequency of the frequency band used by the wireless communication system.

14. The method according to claim 9, wherein the first downlink signal of the first user and the first uplink signal of the first user are transferred via a common connection, which is connected to the first antenna.

15. The method according to claim 9, wherein the downlink signals and the uplink signals of the first user are separated in time by a time division duplex (TDD), and wherein the filter includes at least one switch.

16. The method according to claim 9, wherein the downlink signals and the uplink signals of the first user are separated in frequency by a frequency division duplex (FDD), and wherein the filter includes a duplex filter.

* * * * *

UNITED STATES PATENT AND TRADEMARK OFFICE
CERTIFICATE OF CORRECTION

| | | |
|---|---|---|
| PATENT NO. | : 8,737,275 B2 | Page 1 of 1 |
| APPLICATION NO. | : 13/322969 | |
| DATED | : May 27, 2014 | |
| INVENTOR(S) | : Athley et al. | |

It is certified that error appears in the above-identified patent and that said Letters Patent is hereby corrected as shown below:

IN THE CLAIMS:

In Column 10, Line 7, in Claim 8, delete "(LFDD)," and insert -- (FDD), --, therefor.

In Column 10, Lines 62-63, in Claim 13, delete "two-dirnensional" and insert -- two-dimensional --, therefor.

Signed and Sealed this
Eighteenth Day of November, 2014

Michelle K. Lee
*Deputy Director of the United States Patent and Trademark Office*